United States Patent [19]

Maier-Laxhuber et al.

[11] Patent Number: 5,054,544
[45] Date of Patent: Oct. 8, 1991

[54] SORPTION CONTAINER FOR SOLID SORPTION MEDIUM

[75] Inventors: Peter Maier-Laxhuber, Munich; Fritz Kaubek, Gauting, both of Fed. Rep. of Germany

[73] Assignee: Zeo-Tech (Zeolith-Technologie Gmbh), Munich, Fed. Rep. of Germany

[21] Appl. No.: 464,143

[22] Filed: Jan. 12, 1990

[30] Foreign Application Priority Data

Jan. 20, 1989 [DE] Fed. Rep. of Germany ....... 3901558

[51] Int. Cl.$^5$ .............................................. F25B 17/12
[52] U.S. Cl. .................................. 165/104.12; 165/46; 62/46.2; 206/0.7
[58] Field of Search ...................... 62/480, 46.2, 46.1, 62/46.3; 165/46, 104.12; 206/0.7

[56] References Cited

U.S. PATENT DOCUMENTS 4,819,718 4/1989 Ishikawa et al. ............... 165/104.12

Primary Examiner—Albert W. Davis, Jr.
Attorney, Agent, or Firm—Hoffmann & Baron

[57] ABSTRACT

A sorption container for solid sorption medium, for example, zeolite, consists at least partially of a flexible metal corrugated hose, whose waves are filled on the inside with sorption medium.

15 Claims, 2 Drawing Sheets

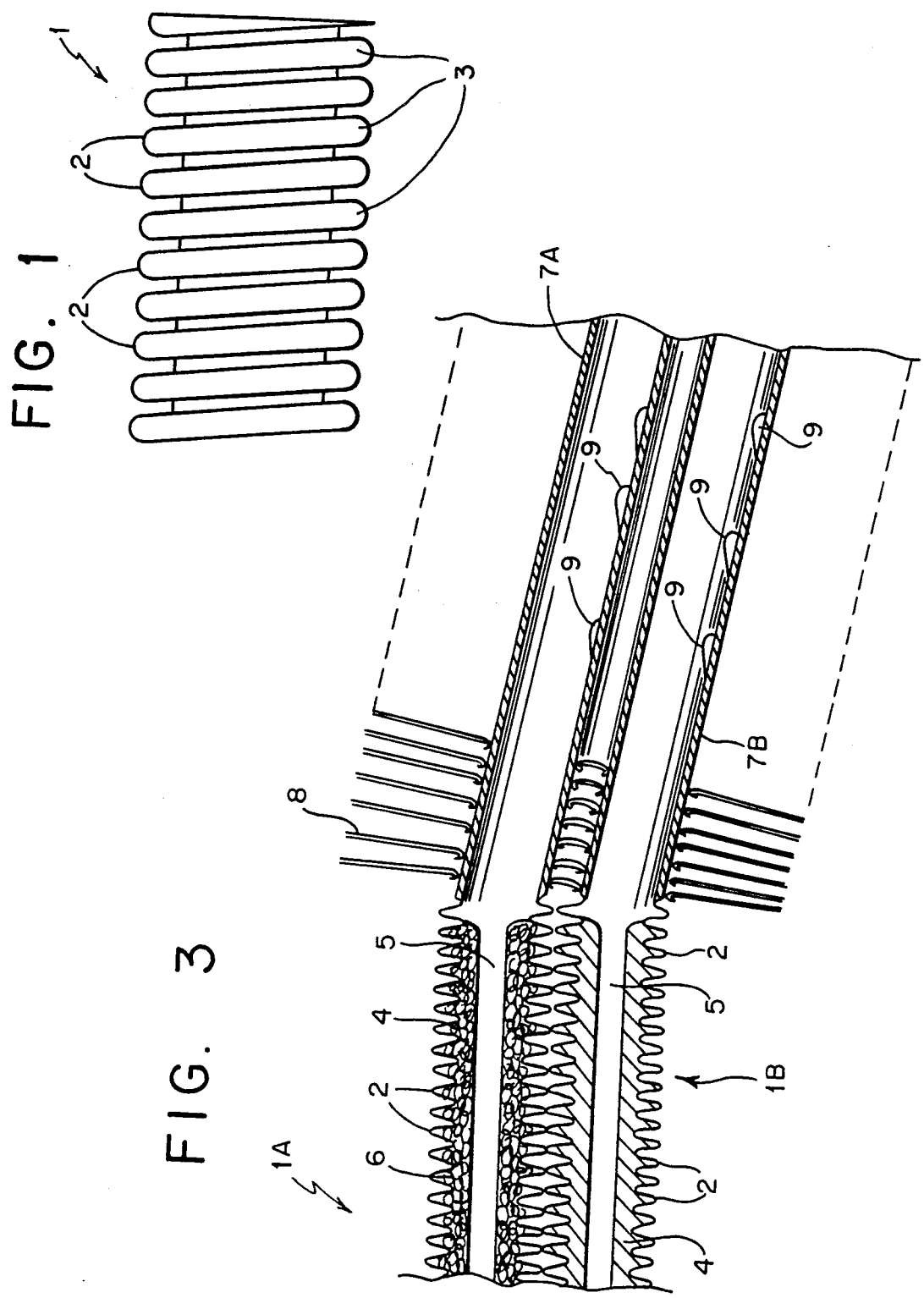

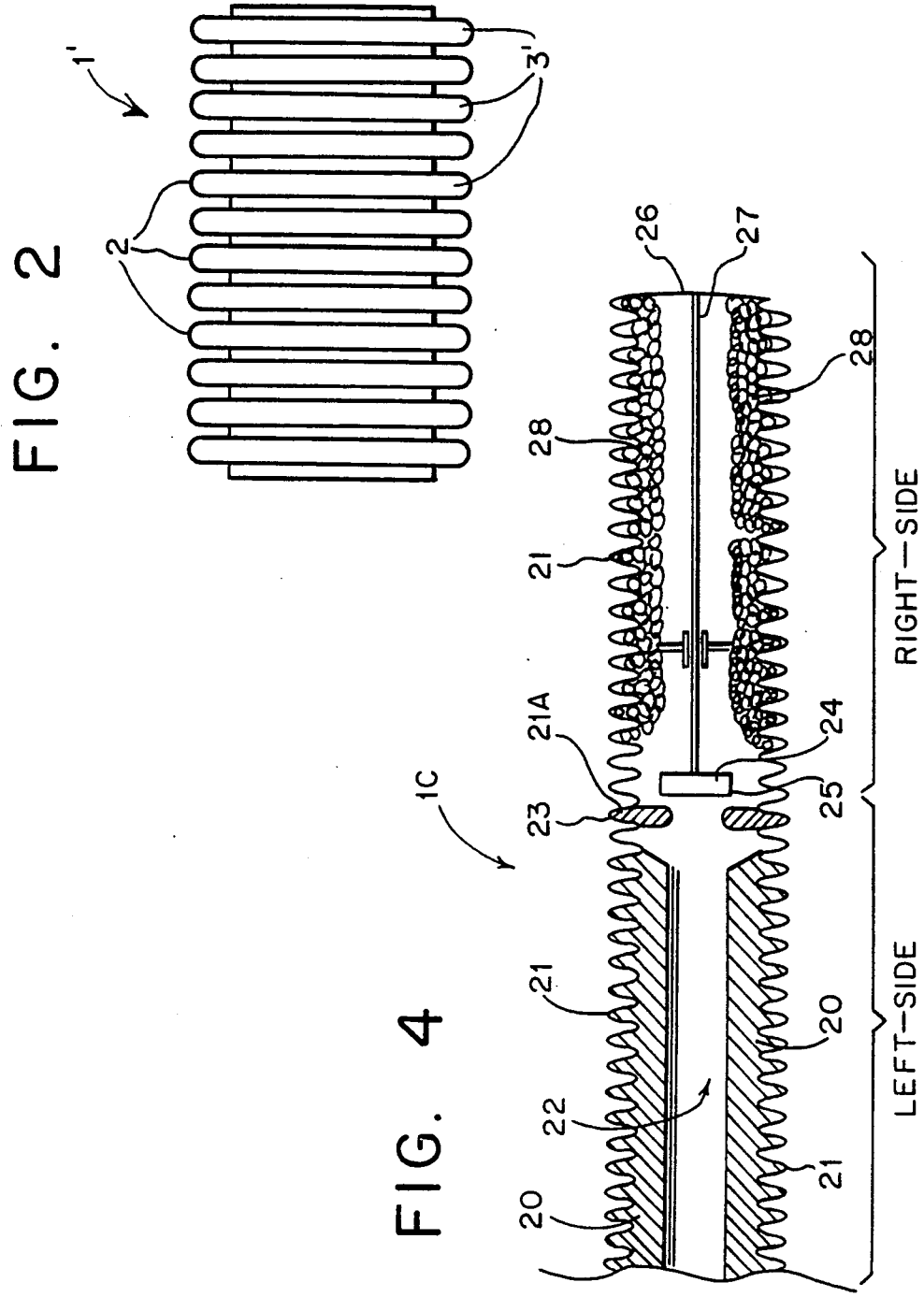

SORPTION CONTAINER FOR SOLID SORPTION MEDIUM

BACKGROUND OF THE INVENTION

1. Field of the Invention

The present invention relates to a sorption container for solid sorption medium, such as particular zeolites, for example.

2. Description of Prior Art

A wide variety of periodically-operating sorption apparatus are known, and in general, are characterized by having an adsorption phase and desorption phase of operation. In connection with such apparatus in particular, but by no means limited thereto, "sorption medium" is generally understood to mean substances which absorb during the adsorption phase, a more volatile operating medium such as water, for example.

During the adsorption phase of operation of periodically-operating sorption apparatus, adsorption heat is released from the sorption medium, whereas during the desorption phase, desorption heat is supplied to the sorption medium in order to drive off or evaporate the operating medium. Zeolite, for example, is a known sorption medium which together with water as the operating medium, forms a pair of sorption substances which can be used in numerous applications in the heating and cooling arts. Zeolites are crystalline aluminosilicons which are characterized by microscopically small hollow spaces wherein water molecules can be stored during the adsorption phase, upon releasing heat of adsorption and, as a result of their sorption characteristics, offer many advantages over other known "sorption mediums".

German Patent Application DE-OS 35 21 484.4 discloses a particular device which uses the sorption characteristics of zeolites in order to generate heat and cooling power. Devices of this type always require a sorption container which is filled with the sorption medium. The provision and release of the heat of reaction is achieved through suitable heat exchange surfaces provided to the sorption container. The vapor or steam operating medium which is desorbed from the sorption medium (e.g. zeolite) during the desorption phase, is discharged from the sorption container through suitable vapor flow conduits. This discharged vapor flows into a condensor where the vapor condenses into condensate, which eventually is collected in a collection container. During the adsorption phase, water (i.e. condensate) collected in the collection container, evaporates, and the cool vapor flows back into the sorption container, where it is again absorbed by the sorption medium, whereupon heat of adsorption is liberated and discharged from the sorption container.

A plurality of requirements must be simultaneously met for a sorption container having solid sorption medium. On the one hand, the sorption container should have ideal heat exchange characteristics for feeding and discharging the "heat of reaction" during the desorption and adsorption phases, respectively. On the other hand, the sorption container must securely contain and seal off the sorption medium from the outer atmosphere, and simultaneously have optimum flow characteristics for discharging and feeding the operating medium vapor to the sorption medium during the desorption and adsorption phase of operation, respectively. Moreover, the sorption container should be made cost effective and must be designated specifically for transportable equipment.

However, prior art sorption containers are generally expensive to manufacture, are heavy, poorly seal off the sorption medium from the outer atmosphere, and have poor heat exchange capabilities with respect to the sorption medium.

Accordingly, it is a primary object of the subject invention to provide an effective sorption container for a solid sorption medium, which can be made in a cost effective manner, which is characterized by a weight saving and vacuum-proof type of construction, and which permits a good heat transfer to and from the sorption medium.

SUMMARY OF PRESENT INVENTION

According to one of the broader aspects of the present invention, there is provided an adsorption container for containing solid adsorption medium capable of adsorbing an operating medium. In general, the adsorption container comprises a flexible metal corrugated hose having an inner space, a plurality of waves formed therealong, and an adsorption medium filler disposed inside the metal corrugated hose and filling the waves. In one embodiment, the metal corrugated hose is an annular wave hose, whereas in the second embodiment, the metal corrugated hose is a helical wave hose.

Preferably, a flow conduit is formed through the solid adsorption medium inside the hose along the axial direction thereof, to allow vapor operating medium to flow through the adsorption medium filler. In the preferred embodiment, a metal fabric texture is provided to the waves so that the adsorption medium is embedded within the metal fabric texture. In order to desorb the operating medium from the adsorption medium, a heating device can be disposed in the inner space of the metal corrugated hose.

In one embodiment, the metal corrugated hose has an area which is free of adsorption medium, and this adsorption medium free area has sufficient heat exchanging surfaces for condensing and/or evaporating the operating medium. In this adsorption medium free area, there is provided a shut-off means, which is operated (i.e. actuatable) by, for example, deforming the metal corrugated hose in either the axial or lateral direction. Extending from this length of metal corrugated hose, a smooth piece of pipe (from which the waves are typically formed) is provided. Preferably, this pipe has a heat exchanging means such as heat exchanging fins, for providing improved transmission of heat between the operating medium inside the metal corrugated hose and the heat carrier medium flowing over the heat exchanging means. In such an arrangement, operating medium vapor is desorbed from the adsorption medium filler upon application of heat thereto and passes through the opened shut-off means. Thereafter, this vapor condenses in the smooth part of the pipe devoid of adsorption medium, upon removal of heat from the vapor, through the heat exchanging means.

In another embodiment, the adsorption container of the present invention comprises a plurality of metal corrugated hoses combined into a hose bundle.

BRIEF DESCRIPTION OF THE DRAWINGS

For a further understanding of the objects of the present invention, reference is made to the following detailed description of the preferred embodiment which is to be taken in connection with the accompanying drawings, wherein:

FIG. 1 is a schematic illustration of one embodiment of the sorption container of the present invention, showing a metal corrugated hose having helical waves therealong;

FIG. 2 is a schematic illustration of another embodiment of the sorption container of the present invention, showing a metal corrugated hose having annular waves therealong;

FIG. 3 is a longitudinal cross-sectional view of a portion of yet another embodiment of the sorption container of the present invention, showing two metal corrugated hoses each having smooth pipe ends with heat-exchanging fins; and FIG. 4 is a longitudinal cross-sectional view of another embodiment of the sorption container of the present invention, showing a first section of corrugated hose filled with sorption medium having a flow conduit, and a second section of corrugated hose being free of adsorption medium and having a shut off means.

DETAILED DESCRIPTION OF PREFERRED EMBODIMENTS

Referring to FIGS. 1 and 2, there are shown two different types of metal corrugated hoses 1 and 1' which are used in constructing the sorption container of the present invention. In both types of hoses 1 and 1', the swivel-like waves 2 are formed into the tubular surface 3 and 3' respectively of the metal hoses, and are shaped so that the inner area of the waves are adapted for the reception of the sorption medium e.g., zeolite. Notably, in both types of hoses, the inner area of the waves is preferably larger in its volume than the outer area over which a heat carrier medium, generally air (not shown), is fed to the sorption container for the transmission of heat, typically during both the desorption and absorption phases.

In the helical wave hose illustrated in FIG. 1, there are continuously connected, right-handed helical waves 3 having a constant pitch throughout the total length of the hose. In contrast thereto, in the annular wave hose shown in FIG. 2, there is a plurality of closed waves 3' each having the same distance with respect to each other, whose main plane is vertical with respect to the hose axis.

Referring to FIG. 3, there is shown a cross-sectional longitudinal view of one embodiment of the sorption container of the present invention. The sorption container comprises metal corrugated hoses 1A and 1B, each containing zeolite fillers 4 filling up the waves 2. As shown in FIG. 3, an axially-located flow conduit 5 is formed in the fillers 4 so that the operating medium vapor may flow therealong and access the sorption medium 4 without occasioning a vapor pressure drop. In the upper corrugated hose 1A, the zeolite filler 4 is additionally provided with a fine meshed metal fabric 6 into which zeolite is imbedded. This metallic fabric 6 within the zeolite filler material 4 serves to increase the stability thereof, and simultaneously improves the heat conductivity in the sorption medium (i.e. zeolite) itself.

A heating element (not shown) may also be installed within the metal corrugated hoses 1A and 1B along the axial direction thereof, so that the sorption medium 4 can be heated as required during any particular desorption process. In connection therewith, the installation of a metal socket for receiving an electrical heating cartridge is advantageous, for example, if the sorption medium should be electrically heated. Also, in the event that cooling of the adsorption medium is required, a cooling element can be placed on the outside of the metal corrugated hose along the axial direction thereof, so that cooling occurs through the surface of the metal corrugated hose.

Annular wave hoses of the type shown in FIG. 2, are commonly made from smooth pipes. The smooth pipes 7A and 7B which are used for making the corrugated hoses 1A and 1B respectively, are not separated at one end of the corrugated hoses. The smooth pipe piece ends 7A and 7B which remain during manufacturing of the waves 2, are typically designed with a gradient or bend with respect to annular wave hoses 1A and 1B. As shown in FIG. 3, these smooth pipe piece ends are also provided on the outer surface area thereof, with correspondingly apertured thin-sheet metal plates (i.e. heat exchanging fins) 8 and are mechanically connected with the smooth pipe ends in a good heat conducting manner. Notably, these heat exchanging fins 8 ensure a good heat transmission to and from the operating medium within the smooth pipe 7A and 7B. To ensure this good mechanical and thermal connection, the pipes have been widened, for example, by means of a mandrel which is introduced into the pipes until the thin sheet metal plates 8 are mechanically connected with the smooth pipes 7A and 7B in a good heat exchanging manner. Thus, for example, when cool air is fed over the thin sheet metal plates 8, vapor operating medium desorbed from the zeolite filler 4 is condensed inside the smooth pipe pieces 7A and 7B (which function as condensors). In turn, the condensate 9 formed along the pipe pieces, can run off into a collecting container (not shown) when the pipe pieces are disposed in a declined position with respect to the corrugated hoses 1A and 1B, as shown in FIG. 3 in particular.

In another embodiment of the present invention, a plurality of metal corrugated hoses such as 1A and 1B for example, can be arranged into bundle-like configuration. In such an embodiment, all of the smooth pipe ends 7A, 7B ... can be commonly equipped with the heat exchanging fins 8 fixedly attached onto the smooth pipe ends by widening the pipe pieces. In this manner, an air-cooled condenser realized thereby, can be provided to this bundle-like configuration, in a weight saving manner, while not requiring any additional welding or soldering.

FIG. 4 shows a longitudinal cross-sectional view of a section of another embodiment of the sorption container of the present invention. In general, the sorption container hereof comprises left and right side portions of the corrugated metal hose 1C. On the left side portion of the corrugated hose 1C, there is provided solid sorption medium 20 which fills the waves 21 of the hose to provide a sorption medium filler. Formed through the sorption medium 20, is a flow conduit 22 which allows for the passage of vapor operating medium as described hereinabove. As shown in FIG. 4, the right side of the corrugated hose 1C, is free of sorption medium, and a shut off means and liquid operating medium are contained therein instead.

As illustrated in FIG. 4, the shut off means comprises an apertured disk 23 which, along its outer area, is formed into a wave 21A of the corrugated hose 1C, in a vapor tight manner. The apertured disk 23 serves as a seal seat for a stanchion 24 provided with a packing 25. The stanchion 24 is mounted on the end cap 26 of the metal corrugated hose by means of a linkage 27. During a movement of the metal corrugated hose 1C in axial direction, the shut off means can be automatically opened or closed, as desired. In sorption apparatus under vacuum pressure, the shut off means in the rest position remains closed due to the flexibility of the corrugated hose. The shut off means can be opened by applying an outside force, which causes an expansion (i.e. elastic deformation) of the metal corrugated hose between the apertured sheet metal disk 23 and end cap 26, so that the operating medium can evaporate, flow through flows conduit 22, and adsorb into the sorption medium 20. In this particular embodiment, a leakage free shut off means is provided which can be made in a very cost effective manner. The inner region of corrugated hose 1C between the apertured disk 23 and the end cap 26, is additionally covered with an absorbent material 28 such as metal texture. This absorbent material 28 uniformly distributes the condensed operating medium in the right hand portion of hose 1C, during the desorption phase of operation, and simultaneously acts as a drip separator for vapor operating medium during the adsorption phase.

It is particularly advantageous to bend each metal corrugated hose in the center by about 180° and to arrange the two hose shanks parallel with respect to each other. In this manner, one costly locking cap per wave hose can be saved. This is particularly advantageous where the sorption container comes in contact with hot exhaust gases, since welded or soldered end caps would require a high manufacturing effort in this aggressive (i.e. hot exhaust gas) medium.

On the right side portion of the metal corrugated hose 1C, during the adsorption process, the heat adsorbed from the liquid operating medium to evaporate a portion thereof, rapidly lowers the temperature of the remaining amount of liquid operating medium in the hose. The cooling power which is generated by this evaporation during the adsorption process, can be transmitted over the surface of the corrugated hose in a particularly efficient manner, for a variety of purposes.

Metal-corrugated hoses for use in carrying out the present invention are described, for example, in the Taschenbuch Nr.301, Ausgabe 1984. of Fa. Witzenmann GmbH Metallschlauch-Fabrik Pforzheim. In accordance therewith, the base material for corrugated hoses are either seamless or longitudinally welded relatively thin-walled pipes. In these relatively thin-walled pipes, the swivel-like waves 2 can be impressed into smooth pipes, by means of special hydraulic tools. Alternatively, thin-walled bands of metal can be provided with wave-like profiles using a continuous metal forming process, then wound about on appropriate hose diameter, and thereafter welded together to form a relatively thin-walled pipe with swivel-like waves 2. Using this principle of corrugated metal hose construction, waves 2 having an increased height dimension can be produced, into which additional sorption medium can be filed. Also, such constructed metal configurated hoses typically will have a better than average resistance to operating medium pressure.

Metal corrugated hoses used in constructing sorption containers of the present invention, have the advantage of being absolutely sealed tight from external atmosphere, and have a large pressure resistance and low space requirements. Marketable production sizes for metal corrugated hoses for use in the sorption container the present invention, typically are between 3 to 350 mm inside diameter. The permissible operating pressures using such metal corrugated hoses, may reach up to 500 bar. An operating temperature threshold of up to about 650° C. is assured using metal corrugated hoses of the present invention, however such a threshold is dependent on the operating pressure.

In addition to the already mentioned advantages of metal corrugated hoses of the present invention, an optimal heat transmission to and from the sorption medium is made possible. The sorption container of the present invention may be adjusted to the given heat carrier medium, by selecting appropriate dimensions for the wave hose diameter and/or the distance(s) between waves 2 of the metal corrugated hose hereof.

A good heat exchange with the sorption medium is assured in view of the high flexibility of the metal corrugated hose of the present invention. In particular, in equipment under vacuum, the wave flanks shown in FIGS. 1, 3 and 4 are pressed onto the sorption medium by the outer excess pressure provided by the air pressure outside the hose. This external air pressure causes the hose to contract inwardly, pressing the waves flanks against the sorption medium filler 4, resulting in a good heat conductivity through the sorption medium filler 4 and hose, to the ambient atmosphere outside the hose.

When using a helical wave hose, a heat carrier medium can be fed transversely to the metal corrugated hose of the present invention. Also, such a hose can be more strongly subjected to turbulence in comparison with the annular wave hose.

A particularly effective application of the metal corrugated hose hereof is provided when the portion of the hose having no sorption medium present, is contacted with a heat carrier of a temperature different than the temperature of the portion of the hose filled with the sorption medium. In this manner, for example, the sorption medium portion of the hose hereof may be used as a condenser or evaporator for the operating medium.

While the particular embodiment shown and described above has proven to be useful in many applications involving the adsorption arts, further modifications herein disclosed will occur to persons skilled in the art to which the present invention pertains and all such modifications are deemed to be within the scope and spirit of the present invention defined by the appended claims.

What is claimed is:

1. A sorption container for containing sorption medium capable of adsorbing an operating medium, said sorption container comprising:

a flexible corrugated hose having an inner space and a plurality of waves formed therealong wherein the flexible corrugated hose flexes when a negative pressure is exerted upon the interior of the flexible metal corrugated hose; and sorption medium filler disposed inside of said corrugated hose, and filling at least a portion of said waves.

2. The sorption container in accordance with claim 1, wherein said corrugated hose is a annular wave hose.

3. The sorption container in accordance with claim 1, wherein said corrugated hose is a helix wave hose.

4. The sorption container in accordance with claims 2 or 3, wherein said corrugated hose has an axial direction, and wherein a flow conduit is formed through sorption medium inside said hose, extends substantially in the axial direction of said corrugated hose so that vapor operating medium can flow through said sorption medium filler.

5. The sorption container in accordance with claim 4, which further comprises a metal fabric texture provided to said waves so that said sorption medium is embedded within said metal fabric texture.

6. The sorption container in accordance with claim 5, which further comprises a heating device disposed within said inner space of said corrugated hose.

7. The sorption container in accordance with claim 6, wherein said corrugated hose has a hairpin like curve formed therein.

8. The sorption container in accordance with claim 1, wherein at least one end of said corrugated hose has an are free of said sorption medium.

9. The sorption container in accordance with claim 8, wherein said sorption medium free area has sufficient heat exchanging surfaces for condensing and/or evaporating said operating medium.

10. The sorption container in accordance with claim 8, wherein said sorption medium free area is provided with a shut off means, whereby said corrugated hose is deformed in axial or lateral direction for the actuation of said shut off means.

11. The sorption container in accordance with claim 1, which further comprises a plurality of said corrugated hoses combined into a hose bundle.

12. Sorption container in accordance with claim 1, wherein said corrugated hose is arranged adjacent with a heat carrier medium flowing in a lateral direction with respect to said corrugated hose.

13. The sorption container in accordance with claim 12, wherein at least one end of said corrugated hose is extended with a smooth piece of pipe piece.

14. The sorption container in accordance with claim 13, which further comprises a heat exchanging means thermally connected to the outer area of said smooth piece of pipe, for providing an improved transmission of heat between said operating medium inside said corrugated hose and said heat carrier medium flowing over said heat exchanging means.

15. The sorption container in accordance with claim 14, wherein said heat exchanging means comprises a plurality of spaced-apart metal plates thermally connected to said smooth piece of pipe.

* * * * *

UNITED STATES PATENT AND TRADEMARK OFFICE
CERTIFICATE OF CORRECTION

PATENT NO. : 5,054,544
DATED : October 8, 1991
INVENTOR(S) : Peter Maier-Laxhuber and Fritz Kaubek It is certified that error appears in the above-identified patent and that said Letters Patent is hereby corrected as shown below:

In Claim 8, Column 7, line 13, before "free", change "are" to --area--.

Signed and Sealed this

Eighteenth Day of May, 1993

Attest:

MICHAEL K. KIRK

Attesting Officer

Acting Commissioner of Patents and Trademarks